US 6,891,945 B2

(12) United States Patent
Porter et al.

(10) Patent No.: US 6,891,945 B2
(45) Date of Patent: May 10, 2005

(54) METHOD OF AND SYSTEM FOR PROVIDING SERVICES IN A COMMUNICATIONS NETWORK

(75) Inventors: Kelvin Porter, Dallas, TX (US); Carol Waller, Allen, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 10/447,252

(22) Filed: May 28, 2003

(65) Prior Publication Data

US 2003/0198335 A1 Oct. 23, 2003

Related U.S. Application Data

(63) Continuation of application No. 09/885,337, filed on Jun. 20, 2001, which is a continuation of application No. 09/089,890, filed on Jun. 4, 1998, now Pat. No. 6,332,023.

(51) Int. Cl.[7] .......................... H04M 3/00; H04M 5/00; H04M 3/42
(52) U.S. Cl. ................... 379/242; 379/207.02; 379/229
(58) Field of Search ................................. 379/243, 244, 379/245, 207.02, 219, 220.01, 229, 230, 242

(56) References Cited

U.S. PATENT DOCUMENTS

| | | | |
|---|---|---|---|
| 4,201,891 A | 5/1980 | Lawrence et al. |
| 4,685,125 A | 8/1987 | Zave |
| 4,713,806 A | 12/1987 | Oberlander et al. |
| 4,747,130 A | 5/1988 | Ho |
| 4,821,034 A | 4/1989 | Anderson et al. |
| 4,872,157 A | 10/1989 | Hemmady et al. |
| 4,893,302 A | 1/1990 | Hemmady et al. |
| 5,157,390 A | 10/1992 | Yoshie et al. |
| 5,195,085 A | 3/1993 | Bertsch et al. |
| 5,226,075 A | 7/1993 | Funk |
| 5,272,749 A | 12/1993 | Masek |
| 5,327,486 A | 7/1994 | Wolff et al. |
| 5,329,520 A | 7/1994 | Richardson |
| 5,390,335 A | 2/1995 | Stephan et al. |
| 5,418,844 A | 5/1995 | Morrisey et al. |

(Continued)

FOREIGN PATENT DOCUMENTS

| | | |
|---|---|---|
| EP | 0559979 | 9/1993 |
| EP | 0812089 | 12/1997 |
| WO | 95/29564 | 11/1995 |
| WO | 96/20448 | 7/1996 |

OTHER PUBLICATIONS

Elixmann et al., "Open Switching—Extending Control Archiectures to Facilitate Applications," International Switching Symposium, vol. 2, Apr. 23–28, 1995, Berlin, Germany, pp. 239–243.

(Continued)

Primary Examiner—Benny Tieu

(57) ABSTRACT

A system for providing services in a communications network includes a service processing function, a universal directory function, and a nodal resource manager. The service processing function receives service requests, formulates requests for interworking functions based upon service requests, and formulates resource requests based upon service requests and interworking functions. The universal directory function receives addresses from the service processing function and returns interworking functions based upon addresses. The nodal resource manager receives resource requests and allocates resources to the service processing function in response to resource requests. The nodal resource manager maintains a resource database that includes an entry corresponding to each network resource managed by the nodal resource manager.

22 Claims, 5 Drawing Sheets

U.S. PATENT DOCUMENTS

| | | |
|---|---|---|
| 5,422,940 A | 6/1995 | Endo et al. |
| 5,455,821 A | 10/1995 | Schafer et al. |
| 5,469,500 A | 11/1995 | Satter et al. ........... 379/201.05 |
| 5,475,817 A | 12/1995 | Waldo et al. |
| 5,483,585 A | 1/1996 | Parker et al. |
| 5,513,127 A | 4/1996 | Gard et al. |
| 5,530,852 A | 6/1996 | Meske, Jr. et al. |
| 5,548,726 A | 8/1996 | Pettus ........................ 709/221 |
| 5,551,035 A | 8/1996 | Arnold et al. |
| 5,572,581 A | 11/1996 | Satter et al. ........... 379/201.05 |
| 5,572,583 A | 11/1996 | Wheeler, Jr. et al. |
| 5,583,920 A | 12/1996 | Wheeler, Jr. |
| 5,603,085 A | 2/1997 | Shedlo |
| 5,608,446 A | 3/1997 | Carr et al. |
| 5,610,976 A | 3/1997 | Uota et al. |
| 5,619,557 A | 4/1997 | Van Berkum |
| 5,619,562 A | 4/1997 | Maurer et al. |
| 5,655,007 A | 8/1997 | McAllister |
| 5,661,782 A | 8/1997 | Bartholomew et al. |
| 5,664,102 A | 9/1997 | Faynberg |
| 5,694,463 A | 12/1997 | Christie et al. |
| 5,703,940 A | 12/1997 | Satter et al. ........... 379/201.05 |
| 5,712,908 A | 1/1998 | Brinkman et al. |
| 5,724,406 A | 3/1998 | Juster |
| 5,724,419 A * | 3/1998 | Harbuziuk et al. .... 379/266.04 |
| 5,742,905 A | 4/1998 | Pepe et al. |
| 5,748,468 A | 5/1998 | Noteboom et al. |
| 5,761,290 A | 6/1998 | Farris et al. |
| 5,781,624 A | 7/1998 | Mitra et al. |
| 5,784,617 A | 7/1998 | Greenstein et al. |
| 5,787,160 A | 7/1998 | Chaney et al. |
| 5,802,157 A | 9/1998 | Clarke et al. |
| 5,812,533 A | 9/1998 | Cox et al. |
| 5,818,921 A | 10/1998 | Vander Meiden et al. |
| 5,825,869 A | 10/1998 | Brooks et al. |
| 5,826,268 A | 10/1998 | Schaefer et al. |
| 5,838,970 A | 11/1998 | Thomas |
| 5,848,143 A | 12/1998 | Andrews et al. |
| 5,881,134 A | 3/1999 | Foster |
| 5,915,008 A | 6/1999 | Dulman |
| 5,940,616 A | 8/1999 | Wang |
| 5,958,016 A | 9/1999 | Chang et al. |
| 5,966,434 A | 10/1999 | Schafer |
| 6,018,567 A | 1/2000 | Dulman |
| 6,035,028 A | 3/2000 | Ward et al. |
| 6,041,109 A | 3/2000 | Cardy et al. |
| 6,041,117 A | 3/2000 | Androski |
| 6,049,545 A | 4/2000 | Stephenson et al. |
| 6,098,094 A | 8/2000 | Barnhouse et al. |
| 6,104,803 A | 8/2000 | Weser et al. |
| 6,134,433 A | 10/2000 | Joong et al. |
| 6,144,647 A | 11/2000 | Lopez-Torres |
| 6,161,128 A | 12/2000 | Smyk |
| 6,169,735 B1 | 1/2001 | Allen, Jr. et al. |
| 6,175,618 B1 | 1/2001 | Shah et al. |
| 6,181,703 B1 | 1/2001 | Christie et al. |
| 6,260,067 B1 | 7/2001 | Barnhouse et al. |
| 6,301,350 B1 | 10/2001 | Henningson et al. |
| 6,332,023 B1 | 12/2001 | Porter et al. |
| 6,393,476 B1 | 5/2002 | Barnhouse et al. |
| 6,418,461 B1 | 7/2002 | Barnhouse et al. |
| 6,480,890 B1 | 11/2002 | Lee et al. |
| 6,690,788 B1 * | 2/2004 | Bauer et al. ................ 379/242 |
| 6,704,410 B1 * | 3/2004 | McFarlane et al. .... 379/265.05 |

OTHER PUBLICATIONS

Kabay et al., "The Service Node—An Advanced IN Services Element," BT Technology Journal, vol. 13, No. 2, Apr. 1995, Ipswich, Great Britain, pp. 64–72.

Mayer et al., "Service Net–2000: An Intelligent Network Evolution," AT&T Technical Journal, vol. 70, No. 3/4, 1991, Short Hills, USA, pp. 99–110.

Maruyama, "A Concurrent Object–Oriented Switching Program in Chill," IEEE Communications Magazine, vol. 29, No. 1, Jan. 1991, New York, USA, pp. 60–68.

Shabana et al., "Intelligent Switch Architecture," Proceedings of the National Communications Forum, vol. 42, No. 2, Sep. 30, 1988, Chicago, USA, pp. 1312–1320.

* cited by examiner

METHOD OF AND SYSTEM FOR PROVIDING SERVICES IN A COMMUNICATIONS NETWORK

The present application is a continuation of U.S. patent application Ser. No. 09/885,337, now U.S. Pat. No. 6,636,597, filed Jun. 20, 2001, which is a continuation of U.S. patent application Ser. No. 09/089,890, now U.S. Pat. No. 6,332,023, filed on Jun. 4, 1998, which are hereby incorporated by reference in its entirety.

FIELD OF THE INVENTION

The present invention relates generally to methods and systems for providing services in communications networks, and more particularly to a method of and system for processing requests for services in a telecommunications network.

DESCRIPTION OF THE PRIOR ART

In the public switched telephone network, calls among subscribers who are connected to different end offices are routed via trunk lines, and sometimes through intermediate tandem switching offices and interexchange switches as well. Traditionally, a call is routed based upon a portion of the dialed number. For example, in the United States, a local dialed number consists of seven digits, of which the first three digits (the so-called "NXX" portion) identifies the destination exchange.

When a caller picks up a telephone receiver, the caller becomes actively connected to an end office, as evidenced by a dial tone. After a caller dials a destination telephone number, the end office receiving the digits, i.e., the originating exchange, examines the dialed number to extract the destination exchange. If the destination exchange is different from the originating exchange, the call must be routed toward the destination exchange over one of the many trunk groups connected to the originating exchange. In order to direct a call along an appropriate trunk group leading to the correct destination exchange, a routing table is configured within each switch. The routing table contains a preset list of trunk groups pertaining to each destination exchange. The routing table is consulted to map the logical intent of reaching the destination number through the physical reality of which trunk lines connect to which other switches.

Commonly, the routing table contains an ordered list of preferred and alternate trunk groups for each destination exchange. For example, a preferred trunk group may be those directly connected to the destination exchange whereas alternate trunk groups might connect indirectly through tandem switches. In the course of routing a call, a preferred trunk group will be searched first for an available line and channel. If no available lines and channels are found within the preferred trunk group, then an alternate trunk group will be searched for available lines. A fixed number of trunk groups is searched in the preference order recorded in the routing table.

The contents of each routing table and each switch in a network is dependent upon the topology of the network and must be changed if nodes are added, deleted, or logically rearranged. Moreover, the routing tables are interpreted locally and populated differently for each switch. Changes must be coordinated among all switches to keep the network functioning properly. Any time an NXX or switch is added or the telephone network is otherwise logically rearranged, then the contents of every routing table and every switch in every network must be updated in a coordinated fashion. In the U.S., a private sector entity maintains a local exchange routing guide upon which all network owners base their routing tables.

Although the traditional routing table approach has sufficed for traditional telephone use under normal conditions, it has become inadequate to accommodate new types of services and traffic. The traditional routing table approach is based upon the assumptions of slow change and network configuration and homogeneity among both traffic types and network paths. More specifically, the traditional routing table approach is inflexible. The traditional routing table approach is cumbersome to maintain and it cannot accommodate rapid changes in the network configuration, such as those arising from network growth, or sudden changes in traffic, such as those arising from emergencies and the like. The traditional routing table approach does not provide an opportunity to perform intelligent routing on a per-call basis and it cannot take into account other factors such as class of services, bandwidth, or priority associated with the originator or the network service being invoked. Instead, the route selection algorithm is implicit in the routing tables and is specified in a very constrained manner by the organization of data in the tables. Moreover, the traditional routing table approach does not lend itself to the rapid implementation of new services.

U.S. Pat. No. 5,226,075 discloses a method and apparatus by which a telephone call is routed differently through an interexchange network based upon called number, calling number, and origination data such as a requested class of service. A database is used to map these parameters into a destination switch number. A call might be routed differently, even to different terminating switches, based upon the dialed number or, at best, a bandwidth or quality level as inferred for a given call. The system of the '075 patent is directed by the relatively fixed contents of database tables. The database tables take into account only a few origination parameters, can choose only from a relatively few different paths, and can take actions only as preplanned by whoever populates the database tables. Changes to the physical network may require reengineering of the contents of the tables.

The approach of the '075 patent cannot optimize the path subject to instantaneous changes in the network or based upon per-resource cost metrics. More generally, the '075 patent continues to confound service and addressing functions within a single database. As in traditional telephony, there is no recognition of the need to segregate service logic and addressing data. Furthermore, the approach of the '075 patent cannot effectively serve new types of traffic or services that may require flexible allocation of intervening resources, such as store-and-forward devices.

There is a need for a flexible routing technique in a telecommunications network that encompasses more than a fixed mapping of numbers to trunk groups, or a fixed mapping of origination information to network resources. A new routing technique is required that takes into account many factors in routing a call and it can be applied in a multi-purpose communications network, rather than just for telephony.

SUMMARY OF THE INVENTION

The present invention provides a method of and a system for providing services in a communications network. The system includes a service processing function, a universal directory function, and a resource manager. The service processing function receives service requests, formulates requests for interworking functions based upon service requests, and formulates resource requests based upon service requests and interworking functions. The universal directory function receives logical addresses from the service processing function and returns interworking functions based upon addresses. The resource manager receives resource requests and allocates resources to the service processing function in response to resource requests. The resource manager accesses and updates a resource database that includes an entry corresponding to each network resource managed by the resource manager.

Each entry of the resource database includes a resource identifier, a set of static attributes, and a set of dynamic attributes. A resource identifier uniquely identifies a resource. Static attributes are relatively stable data about the type and configuration of the resource. Dynamic attributes are changing data about the resource that are tracked by the resource manager, including such data as whether the resource is being used, and if so, by whom. If a resource is allocated, the dynamic attribute of the resources will include an indicator on how to find the priority of the allocation. This is because the priority of an allocation could be dynamic, i.e., the function owning a resource may assign varying priority during the duration of the allocation, or static, i.e., the priority is determined at allocation time and is fixed, so that it can be stored in the resource.

A resource request includes a selection function. The resource manager uses the selection function to search the attributes of the resource database to locate a set of candidate resources. The selection function may be used to search both the static attributes and the dynamic attributes. A selection function preferably includes a priority criterion, which indicates the priority level assigned to the request or requester. If the requestor's priority criterion is higher than the priority attribute of an allocated resource, that resource is deemed to be eligible for selection.

A resource request also includes an evaluation function. The resource manager uses the evaluation function to evaluate the attributes of the set of candidate resources to determine a best candidate resource. The resource manager sorts or ranks the candidate resources according to the evaluation function. The resource manager allocates the best candidate resource to the requesting service processing function and indicates the identity and priority of the requesting service processing function. The resource manager then configures the best candidate in preparation for fulfilling the request.

Preferably, the evaluation function ranks un-allocated candidate resources higher than allocated candidate resources. However, occasionally the best candidate may already be allocated to a lower priority service processing function. In those situations, the resource manager de-allocates the best candidate resource and notifies the earlier service processing function that its use of the resource has been preempted. Then the resource manager reconfigures the resource and allocates the resource to the higher priority service processing function.

Every resource manager has a domain, which is the set of resources managed by the resource manager. The domain of a nodal resource manager is the set of resources available to a network node, as the network is currently configured. The system of the present invention may include a network resource manager, whose domain is all connective resources of the network. The network resource manager can reconfigure the network and allocate additional network resources to a nodal resource manager. In the event a nodal resource manager cannot satisfy a resource request, the nodal resource manager may request additional resources from the network resource manager.

DESCRIPTION OF THE PREFERRED EMBODIMENT

Figure 1:
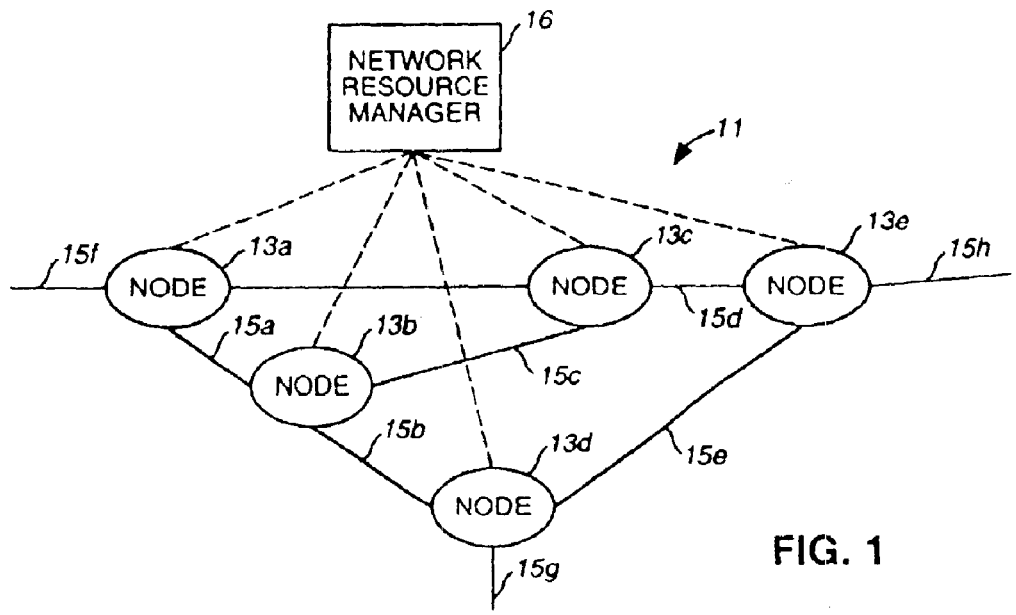
FIG. 1 is a block diagram of a communications network according to the present invention.

Referring now to the drawings, and first to FIG. 1, a portion of a network is designated generally by the numeral 11. Network 11 includes a plurality of nodes 13 interconnected by links 15. As is well known to those skilled in the art, network services, such as the completion of telephone calls, are provided by switching traffic between nodes 13 over selected links 15. Network 11 also includes a network resource manager 16 that can reconfigure network 11 and allocate additional resource to the domain of each node 13, as will be described in detail hereinafter.

Figure 2:
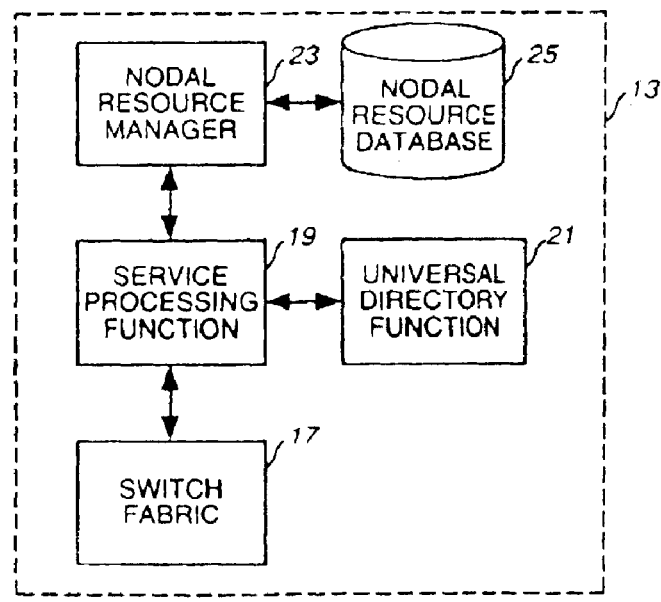
FIG. 2 is a block diagram of a network node according to the present invention.

Referring now to the FIG. 2, a node, according to the present invention, includes a switch fabric 17. A service processing function 19 is adapted to process requests for services, such as telephone calls and instruct switch fabric 17 how to make the connections necessary to fulfill the request for service. A universal directory function 21, which may located on the node or associated with the network resource manager 16, contains a mapping of all types of logical addresses to physical elements within network 11. For example, if the universal directory function 21 is asked for a terminating call half and is given an telephone number, then it returns a normal telephony interworking function and a terminating node address; if the universal directory function 21 is given an IP address, then the universal directory function returns a IP-telephony interworking function and the configuration information to make the connection. When service processing function 19 receives a request for services that requires a connection, it consults universal directory function 21 to obtain a meaningful physical address as well as necessary configuration information.

Node 13 includes a nodal resource manager 23. Nodal resource manager 23 serves as the only gate keeper to all of the resources belonging to its particular domain. The domain of nodal resource manager 23 is determined by the configuration of network 11. According to the present invention, node resources include all communication ports, and devices, such as voice response units, store and forward devices, multiplexers, modems, and the like, that are used in providing network services. Network services are provided by allocating and configuring appropriate network resources.

The resources of the domain managed by nodal resource manager 23 are tracked in a nodal resource database 25.

Each resource within the domain of nodal resource manager 23 is identified by a resource identifier, which uniquely identifies an individual resource. The attributes of each resource includes static attributes, which are relatively stable data about the configuration of the resource, including the type of resource and the capabilities of the resource. The attributes of each resource also include dynamic attributes, which are changing information about the resource that is tracked by the nodal resource manager, such as whether the resource is in service or out of service, available for use, or in use, and by whom.

According to the present invention, the provision of network services, such as routing, occurs as an interaction among service processing function 19, universal directory function 21, and nodal resource manager 23. Rather than having service and addressing mixed together and hard coded within tables, the present invention provides services by allocating network resources in response to user requests. In the preferred embodiment, a prioritization scheme is applied to all network resources and to all user requests. The prioritization scheme allows for the displacement of low priority requests in favor of high priority requests, only when warranted and with consideration for the collective costs involved. Thus, low priority traffic may be preempted in order to make capacity available for high priority traffic. The prioritization scheme of the present invention thus allows radical reconfiguration of the network in the event of natural disasters and the like.

Figure 3:
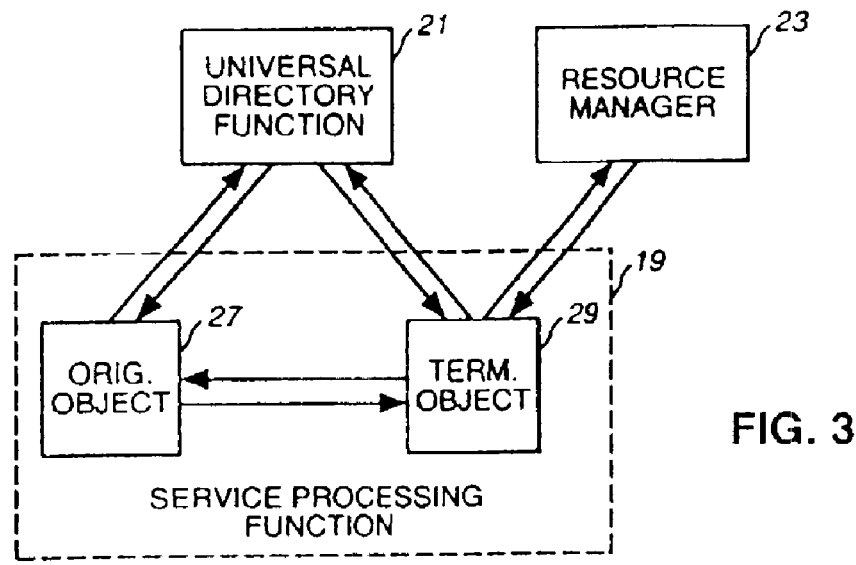
FIG. 3 is a functional diagram of the messaging among objects according to the present invention.

As shown in FIG. 3, the system of the present invention is preferably implemented using object oriented technology. When an originating object 27 of service processing function 19 receives a request for service and determines that it needs to correspond with another service of a particular type to perform a specified function, originating object 27 dispatches a request to universal directory function 21 for a terminating object of that particular type. Universal directory function 21, using an algorithm and stored data, either locates or instantiates a terminating object 29 of that type and sends a configuration message to terminating object 29. Terminating object 29 receives the configuration event and determines whether it needs any resources to perform its duties. The terminating object may not need resources if, for example, the service does not require connection to another node of the network. If terminating object 29 needs a resource or resources, then it synthesizes a resource request.

A resource request may be either a singular resource request or a composite resource request. A singular resource request is made when only a single resource is needed to provide the requested service. A composite resource request is used when a set of resources is required to accomplish the intended task. There are many situations in which two or more resources are required to provide a particular service. Only one resource without the other is useless. Allocating resources one by one can lead to deadlocks and composite resource requests avoid the deadlock problem by preventing contention among partially allocated requests.

A resource request is composed of a number of parameters, some of which may be simple values and others of which may be algorithms. A resource request includes a selection function, which nodal resource manager 23 uses to select a set of candidate resources. The selection function preferably includes a priority criterion so that nodal resource manager 23 may select lower priority resources as candidate resources. A selection request also includes an evaluation function, which nodal resource manager 23 uses to sort or rank the candidates to find a best candidate resource. The evaluation function may also include a sufficiency criterion so that resource manager does not continue to search after finding a candidate resource that is good enough to satisfy the request. A resource request finally includes the identity of the requester and a queuing duration, which specifies how long a nodal resource manager may search for a best candidate resource.

Terminating object 29 dispatches a resource request to nodal resource manager 23. Nodal resource manager 23 executes the selection and evaluation functions and returns a result to terminating object 29. The result is either that the resource or resources were or were not allocated. Terminating object 29 completes its configuration based upon the result received from nodal resource manager 23. After configuration, terminating object 29 notifies the universal directory function 21 that it has completed configuration and universal directory function 21 returns the identity of terminating object 29 to originating object 27. At this point, originating object 27 and terminating object 29 can start exchanging events necessary to provide the requested service.

Figure 4A:
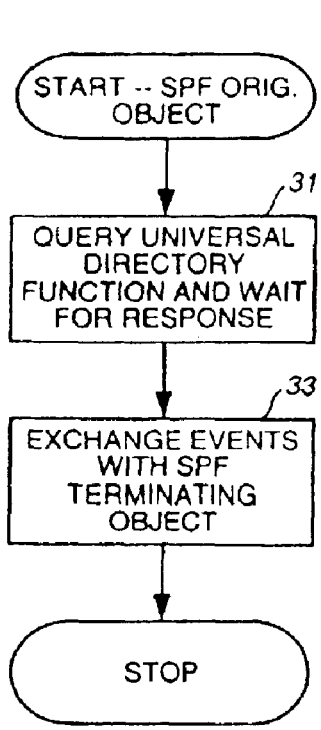
FIGS. 4A and 4B are flowcharts of service processing function originating object and terminating object processing, respectively, according to the present invention.
Figure 4B:
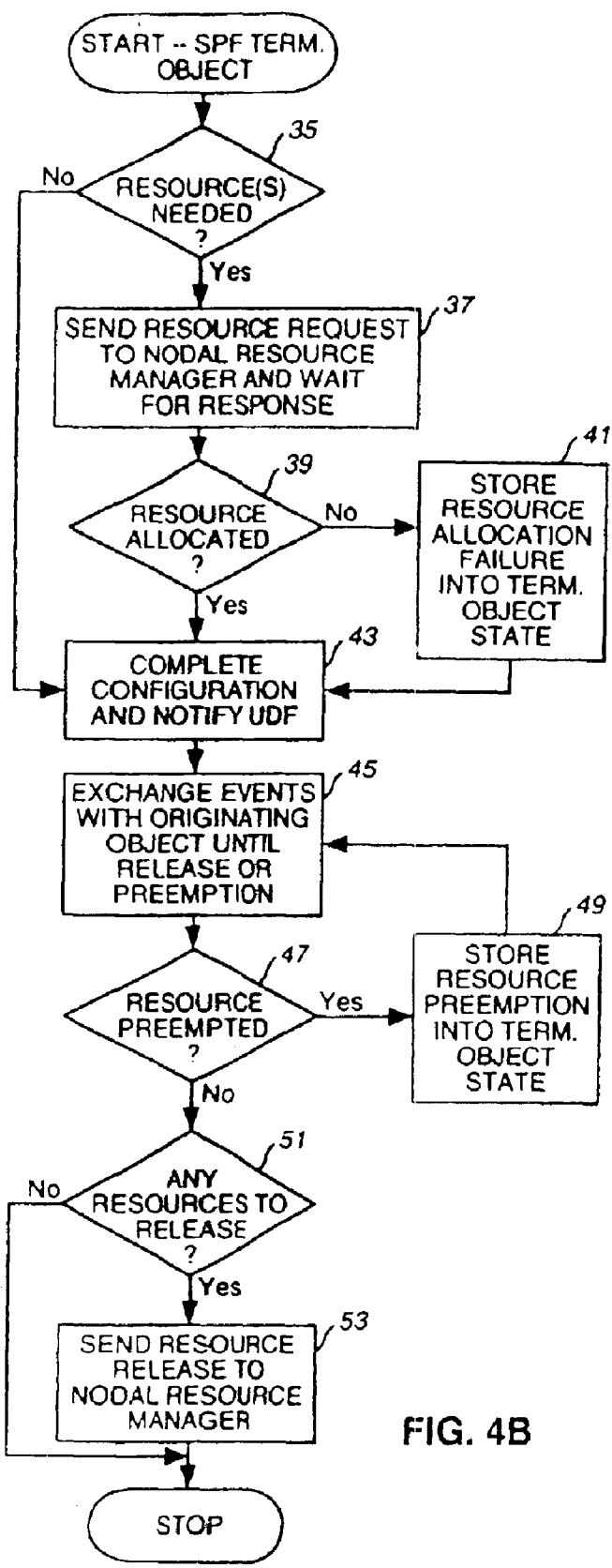

Referring now to FIGS. 4A and 4B, there is shown a high level flow chart of service processing function processing. The service processing function is preferably implemented in object oriented technology. Referring first to FIG. 4A, upon receiving a request for services that requires a connection, the originating object queries the universal directory function and waits for a response, at block 31. When the service processing function originating object receives a response from the universal directory function, the originating object exchanges events with the appropriate service processing function terminating object, the identity of which is returned from the universal directory function, until the requested service is completed, at block 33.

Referring now to FIG. 4B, there is shown a flow chart of service processing function terminating object processing. As will be explained in detail hereinafter, a service processing function terminating object is located or instantiated by the universal directory function. Upon instantiation, the terminating object determines, at decision block 35, if any resources are needed to perform the requested service. If so, the terminating object sends a resource request to the nodal resource manager and waits for a response, at block 37. If, at decision block 39, the resource is allocated, then the terminating object completes configuration and notifies the universal directory function that it is ready to exchange events with the originating object, at block 43. If, at decision block 39, the requested resource is not allocated, then the terminating object stores the resource allocation failure into its object state, at block 41, and processing continues at block 43. Then, at block 45, the terminating object exchanges events with the originating object until release or preemption. If, at decision block 47, a resource necessary to the services preempted, then the terminating object stores the resource preemption into its object state, at block 49, and processing continues at block 45. If, at decision block 51, any resource needs to be released, then the terminating object sends a resource release message to the nodal resource manager, at block 53, and processing ends. If, at decision block 51, no resources need to be released, terminating object processing ends.

Figure 5:
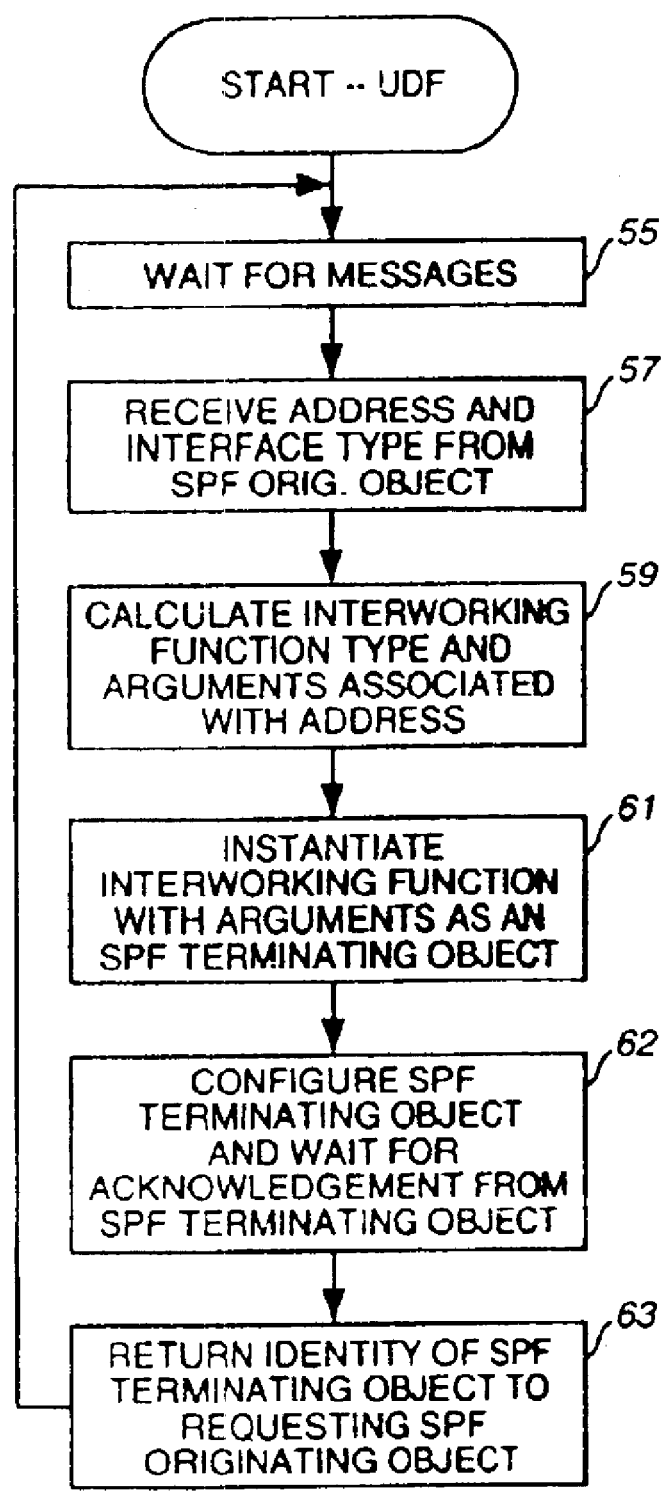
FIG. 5 is a flowchart of universal: directory function processing according to the present invention.

Referring now to FIG. 5, there is shown a high level flow chart of processing by the universal directory function. The universal directory function waits for messages, at block 55. When, at block 57, the universal directory function receives an address from a service processing function originating object, the universal directory function calculates an interworking function type and arguments associated with the address, at block 59. An interworking function represents operative access to the actual physical resources in the network packaged and presented through a specified interface type. Then, the universal directory function instantiates the interworking function with arguments as a service processing function terminating object, at block 61. The universal directory function configures the terminating object and waits for an acknowledgment, at block 62. When the universal directory function receives acknowledgment from the terminating object, the universal directory function returns the identity of the terminating object to the requesting service processing function originating object, at block 63, and returns to block 55 to wait for messages.

Figure 6:
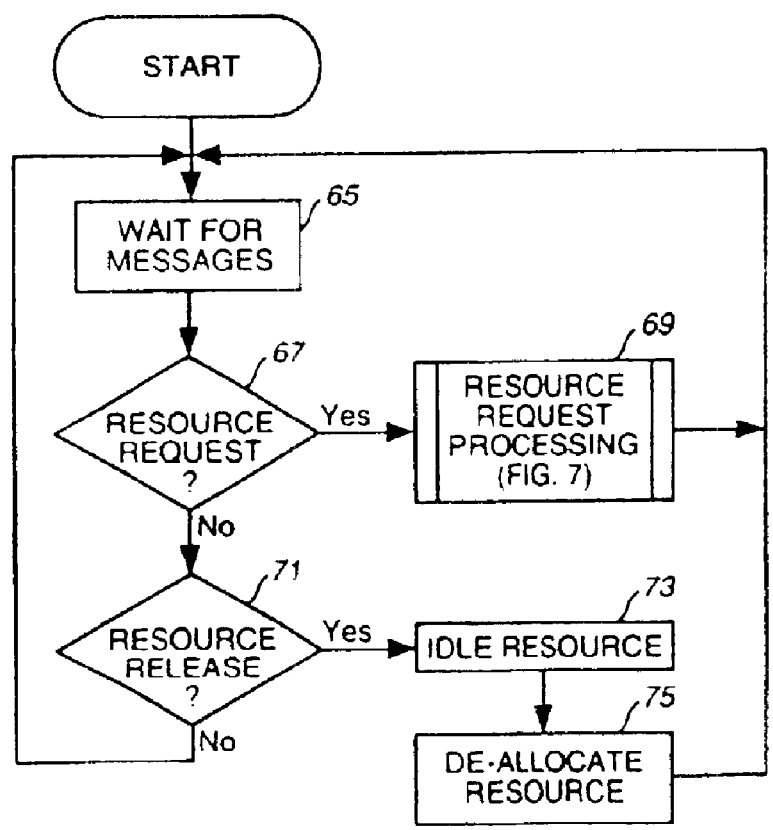
FIG. 6 is a flowchart of resource manager processing according to the present invention.

Referring now to FIG. 6, there is shown a high level flow chart of nodal resource manager processing according to the present invention. The nodal resource manager waits for messages, at block 65. If, at decision block 67, a message is a resource request, the nodal resource manager performs resource request processing, as indicated generally at block 69 and shown in detail with respect to FIG. 7. If, at decision block 71, the message is a resource release, then the nodal resource manager returns the released resource to an idle state, at block 73 and deallocates the resource, at block 75. Deallocation of a resource includes the step of setting the resources in use attribute to available.

Figure 7:
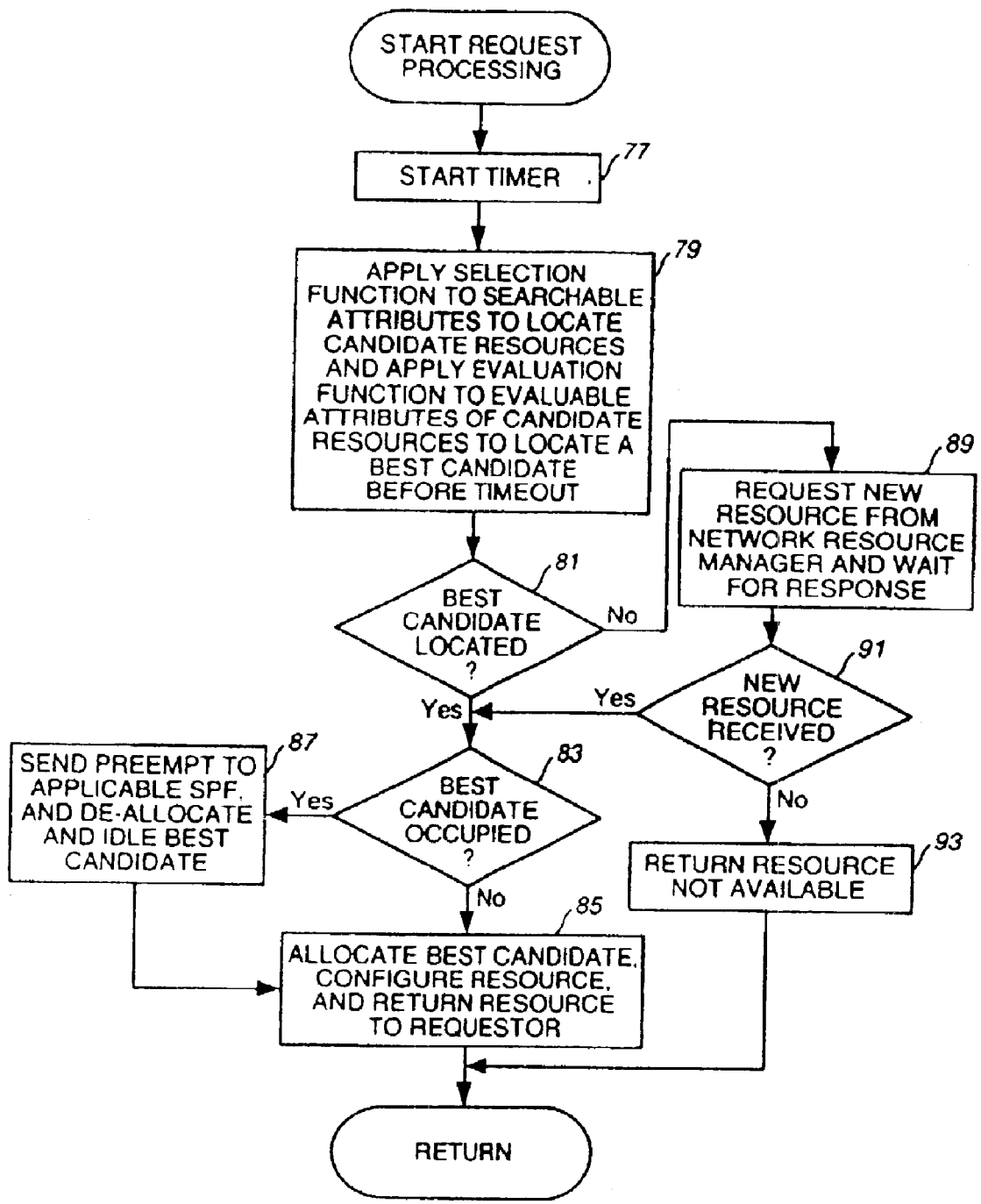
FIG. 7 is a flowchart of resource request processing of FIG. 6.

Referring now to FIG. 7, there is shown a flow chart of nodal resource manager resource request processing, which is indicated generally at block 69 in FIG. 6. The nodal resource manager starts a timer according to the queuing duration parameter of the resource request, at block 77. Then, the nodal resource manager applies the selection function of the resource request to the searchable attributes in the resource database and applies the evaluation criteria of the resource request to the evaluable attributes of candidate resources to locate a best candidate resource before the timer times out, at block 79.

Block 79 processing may be performed in a serial fashion in which the selection function is applied to locate a set of all candidate resources and then the evaluation function is applied to the set of candidate resources to locate a best candidate resource. Alternatively, block 79 processing may be performed in a parallel fashion in which the evaluation function is applied as candidate resources are located according to the selection function. Preferably, the resource request includes a sufficiency criterion, which defines a minimum acceptable level for a best candidate. When the resource manager finds a candidate resource that satisfies the sufficiency criterion, that candidate resource is declared to be the best candidate and block 79 processing ends. Block 79 processing continues until a best candidate is found or the timer times out.

The nodal resource manager determines, at decision block 81, if a best candidate has been located. If so, the nodal resource manager tests, at decision block 83, if the best candidate is already allocated. If not, the nodal resource manager allocates and configures the best candidate resource and returns the resource to the requesting service processing function terminating object, at block 85. If, at decision block 83, the best candidate resource is already allocated, then the nodal resource manager sends a preempt message to the applicable service processing function terminating object, and deallocates and idles the best candidate resource, at block 87. Then, processing continues at block 85.

If, at decision block 81, the nodal resource manager does not locate a best candidate, then the nodal resource manager requests a new resource from the network resource manager and waits for response, at block 89. If, at decision block 91, a new resource is received, then processing continues at decision block 83. If, at decision block 91, a new resource is not received, then the nodal resource manager sends a resource not available message to the applicable service processing function terminating object, at block 93.

From the foregoing it may be seen that the method and system of the present invention are well adapted to overcome the shortcomings of the prior art. Additional resources can be added to the network without having to recode routing tables. A service architect can design and implement a new service by writing a new service processing function that specifies the necessary resources, without know the identity of specific resources. Thus, the present Invention enables new services to be provided quickly with a minimum of recoding. For example, new services may be created based upon different priorities. The prioritization scheme of the present invention allows network resources to be dynamically reserved.

What is claimed is:

1. A method of providing services in a communications network, comprising:

receiving a request for a service by a communications node within the communications network;

determining a criterion for a resource necessary to provide the requested service;

searching a resource data structure for a set of candidate resources meeting said criterion, wherein each resource of said resource data structure comprises a resource identifier;

using an evaluation function, determining the best candidate resource; and allocating, by the communications node, said best candidate resource to meet said request for service.

2. The method as claimed in claim 1, wherein said step of allocating said best candidate resource further comprises:

setting a dynamic attribute of the allocated resource to indicate said allocated resource is in use.

3. The method as claimed in claim 1, wherein said dynamic attributes comprise a free/in-use attribute.

4. The method as claimed in claim 3, wherein said in-use attribute comprises a priority identifier.

5. The method as claimed in claim 1, wherein said step of determining a criterion further comprises setting a priority criterion, and wherein said step of searching a resource data structure for a set of candidate resources meeting said criteria comprises selecting candidate resources with a priority attribute identified by said priority identifier less than said priority criterion.

6. The method as claimed in claim 5, further comprising:

de-allocating a presently in-use best candidate resource with a priority attribute less than said priority criterion.

7. The method as claimed in claim 5, wherein said step of allocating said best candidate resource further comprises:

setting the priority attribute of said best candidate resource to said priority criterion.

8. The method as claimed in claim 1, further comprising:

configuring an allocated resource.

9. The method as claimed in claim 8, further comprising:

de-allocating an allocated resource when said requested service is completed.

10. The method as claimed in claim 1, further comprising:

de-allocating an allocated resource when said requested service is completed.

11. The method as claimed in claim 10, further comprising:
   idling a de-allocated resource.

12. A method of providing services in a communications network, which comprises the steps of:
   receiving a request for a service by a communications node within the communications network;
   determining criteria for a resource necessary to provide the requested service;
   searching a resource data structure for a set of candidate resources meeting said criteria wherein each resource of said resource data structure comprises a set of attributes a resource identifier, a set of static attributes and a set of dynamic attributes,
   evaluating said set of candidate resources to find a best candidate resource; and,
   allocating, by the communications node, said best candidate resource to meet said request for service.

13. The method as claimed in claim 12, wherein said step of allocating said best candidate resource further comprises:
   setting a dynamic attribute of the allocated resource to indicate said allocated resource is in use.

14. The method as claimed in claim 13, wherein said dynamic attributes comprise a free/in-use attribute.

15. The method as claimed in claim 14, wherein said in-use attribute comprises a priority identifier.

16. The method as claimed in claim 12, wherein said step of determining a criterion further comprises setting a priority criterion, and wherein said step of searching a resource data structure for a set of candidate resources meeting said criteria comprises selecting candidate resources with a priority attribute identified by said priority identifier less than said priority criterion.

17. The method as claimed in claim 16, further comprising:
   de-allocating a presently in-use best candidate resource with a priority attribute less than said priority criterion.

18. The method as claimed in claim 16, wherein said step of allocating said best candidate resource further comprises:
   setting the priority attribute of best candidate resource to said priority criterion.

19. The method as claimed in claim 12, further comprising:
   configuring an allocated resource.

20. The method as claimed in claim 12, further comprising:
   de-allocating an allocated resource when said requested service is completed.

21. The method as claimed in claim 20, further comprising:
   idling a de-allocated resource.

22. A communication system comprising:
   a plurality of nodes, wherein each node is configured to determine a criterion for a resource to satisfy a service request, to search a resource database for a set of candidate resources meeting the determined criterion, and to determine an evaluation function for evaluating the set of candidate resources for a best candidate to satisfy the service request; and
   a network resource manager in communication with the plurality of nodes for configuring the nodes wherein the resource data stores a set of static attributes and a set of dynamic attributes for indicating allocation of resources of the nodes.

* * * * *